US009569051B2

United States Patent
Cheng et al.

(10) Patent No.: US 9,569,051 B2
(45) Date of Patent: Feb. 14, 2017

(54) METHOD FOR DETECTING TOUCH POINTS ON A TOUCH PANEL

(71) Applicant: TIANJIN FUNAYUANCHUANG TECHNOLOGY CO.,LTD., Tianjin (CN)

(72) Inventors: Chien-Yung Cheng, New Taipei (TW); Cheng-Tai Huang, New Taipei (TW); Chun-Lung Huang, New Taipei (TW); Feng-Yu Kuo, New Taipei (TW); Po-Sheng Shih, New Taipei (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 87 days.

(21) Appl. No.: 14/602,288

(22) Filed: Jan. 22, 2015

(65) Prior Publication Data
US 2015/0205411 A1    Jul. 23, 2015

(30) Foreign Application Priority Data
Jan. 23, 2014 (CN) .......................... 2014 1 0031605

(51) Int. Cl.
G06F 3/045 (2006.01)
G06F 3/044 (2006.01)
G06F 3/041 (2006.01)

(52) U.S. Cl.
CPC ............ G06F 3/044 (2013.01); G06F 3/0416 (2013.01); *G06F 2203/04104* (2013.01)

(58) Field of Classification Search
CPC ........ G06F 3/041; G06F 3/0416; G06F 3/044; G06F 2203/04101; G06F 2203/04104
See application file for complete search history.

(56) References Cited

U.S. PATENT DOCUMENTS

| 8,810,543 B1* | 8/2014 | Kurikawa | G06F 3/0416 178/18.06 |
| 9,360,973 B2* | 6/2016 | Huang | G06F 3/044 |
| 2010/0321337 A1* | 12/2010 | Liao | G06F 3/0416 345/174 |

(Continued)

*Primary Examiner* — Joe H Cheng
(74) *Attorney, Agent, or Firm* — Zhigang Ma

(57) ABSTRACT

A method for determining touch point coordinates on capacitive type touch panel includes following steps. A touch panel having a conductive layer, a plurality of first electrodes, and a plurality of second electrodes is provided. A first signal curve $A_{s1}$ is obtained by driving and sensing each first electrode. A second signal curve $A_{s2}$ is obtained by driving and sensing each second electrode. A third signal curve $B_{s1}$ is obtained by driving and sensing each first electrode, wherein the second electrode opposite to the sensed first electrode is grounded. A fourth signal curve $B_{s2}$ is gotten by driving and sensing each second electrodes, wherein the first electrode opposite to the sensed second electrode is grounded. The coordinates of the touch points are obtained by comparing the first signal curve $A_{s1}$, the second signal curve $A_{s2}$, the third signal curve $B_{s1}$, and the fourth signal curve $B_{s2}$.

15 Claims, 9 Drawing Sheets

(56) References Cited

U.S. PATENT DOCUMENTS

| | | | | |
|---|---|---|---|---|
| 2011/0007026 A1* | 1/2011 | Chen | G06F 3/045 | 345/174 |
| 2011/0134058 A1* | 6/2011 | Liu | B82Y 30/00 | 345/173 |
| 2012/0056851 A1* | 3/2012 | Chen | G06F 3/0418 | 345/174 |
| 2012/0062512 A1* | 3/2012 | Cheng | G06F 3/044 | 345/174 |
| 2012/0092282 A1* | 4/2012 | Chen | G06F 3/0416 | 345/173 |
| 2012/0242595 A1* | 9/2012 | Yang | G06F 3/0416 | 345/173 |
| 2012/0274582 A1* | 11/2012 | Shih | G06F 3/044 | 345/173 |
| 2013/0057504 A1* | 3/2013 | Huang | G06F 3/044 | 345/174 |
| 2013/0141356 A1* | 6/2013 | Shih | G06F 3/041 | 345/173 |
| 2014/0253501 A1* | 9/2014 | Noguchi | G02F 1/13338 | 345/174 |
| 2014/0292667 A1* | 10/2014 | Huang | G06F 3/0416 | 345/173 |
| 2014/0354578 A1* | 12/2014 | Cheng | G06F 3/044 | 345/174 |
| 2014/0354580 A1* | 12/2014 | Shih | G06F 3/044 | 345/174 |
| 2015/0062068 A1* | 3/2015 | Shih | G06F 3/0416 | 345/174 |
| 2015/0145795 A1* | 5/2015 | Cheng | G06F 3/041 | 345/173 |
| 2015/0145825 A1* | 5/2015 | Cheng | G06F 3/0416 | 345/174 |
| 2015/0160755 A1* | 6/2015 | Huang | G06F 3/0416 | 345/174 |

* cited by examiner providing a capacitive type touch panel comprising a conductive layer, a plurality of first electrodes and a plurality of second electrodes, wherein the conductive layer comprises relative low impedance in a direction X and a relative high impedance in a direction Y, and a first side and second side opposite the first side along the direction X; the plurality of first electrodes located on the first side and electrically connected to the conductive layer; and the plurality of second electrodes located on the second side and electrically connected to the conductive layer

obtaining a first signal curve $A_{s1}$ by inputting driving electrical signals to each of the plurality of first electrodes and sensing each of the plurality of first electrodes one by one, wherein rest of the plurality of first electrodes which are not sensed and the plurality of second electrodes are input a first potential during sensing each of the plurality of first electrodes one by one

getting a second signal curve $A_{s2}$ by inputting driving electrical signals to each of the plurality of second electrodes and sensing each of the plurality of second electrodes one by one, wherein rest of the plurality of second electrodes which are not sensed and the plurality of first electrodes are input a second potential during sensing each of the plurality of second electrodes one by one

obtaining a third signal curve $B_{s1}$ by inputting driving electrical signals again to each of the plurality of first electrodes and sensing each of the plurality of first electrodes one by one, wherein at least one of the plurality of second electrodes which opposite to the sensed one of the plurality of first electrodes is grounded during sensing each of the plurality of first electrodes one by one

getting a fourth signal curve $B_{s2}$ by inputting driving electrical signals to each of the plurality of second electrodes again and sensing each of the plurality of second electrodes one by one, wherein at least one of the plurality of first electrodes which opposite to the sensed one of the plurality of second electrodes is grounded during sensing each of the plurality of second electrodes one by one

determining the number of touch points and obtaining coordinates of the touch points on the touch panel by comparing the first signal curve $A_{s1}$, the second signal curve $A_{s2}$, the third signal curve $B_{s1}$, and the fourth signal curve $B_{s2}$

FIG. 2

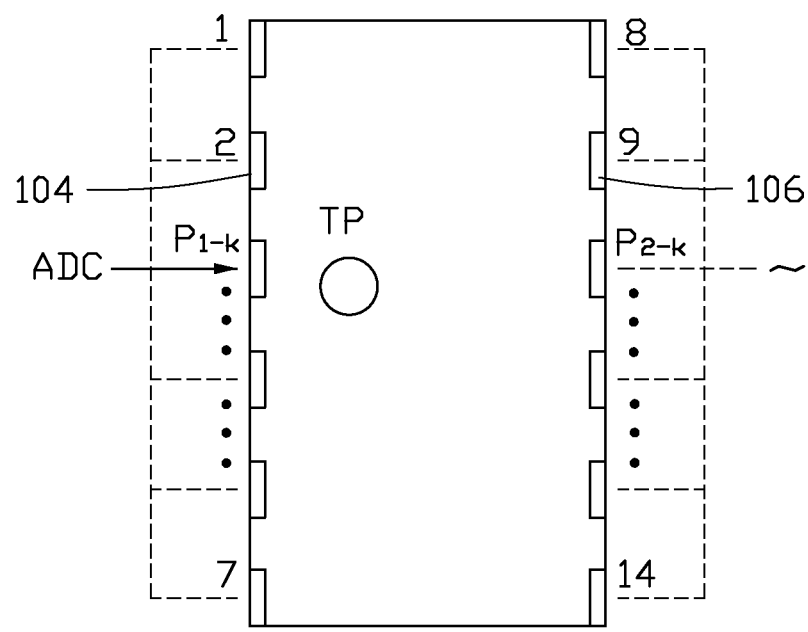
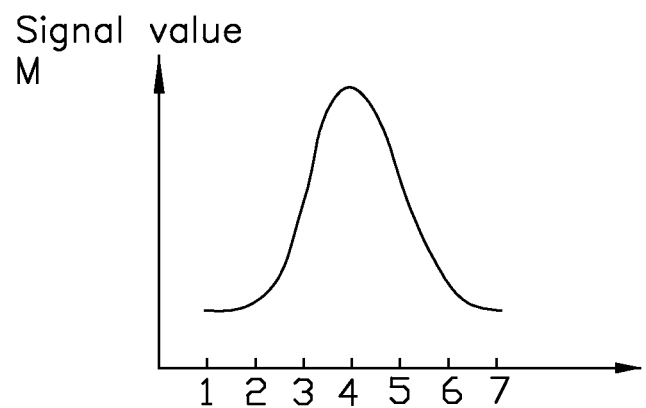
FIG. 3

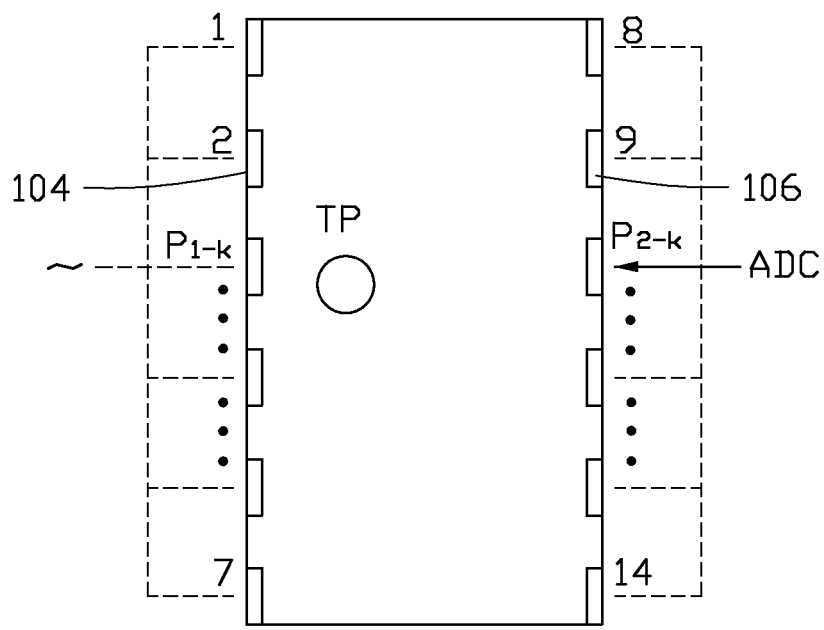
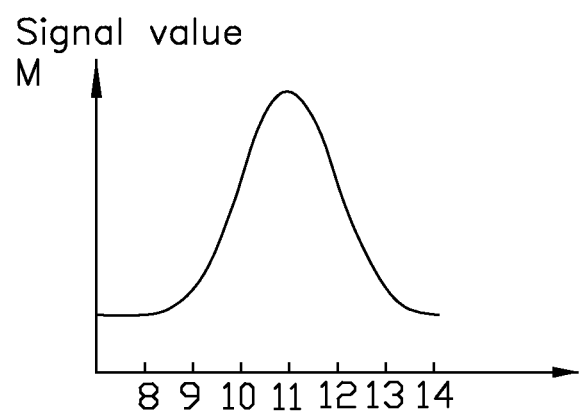
FIG. 4

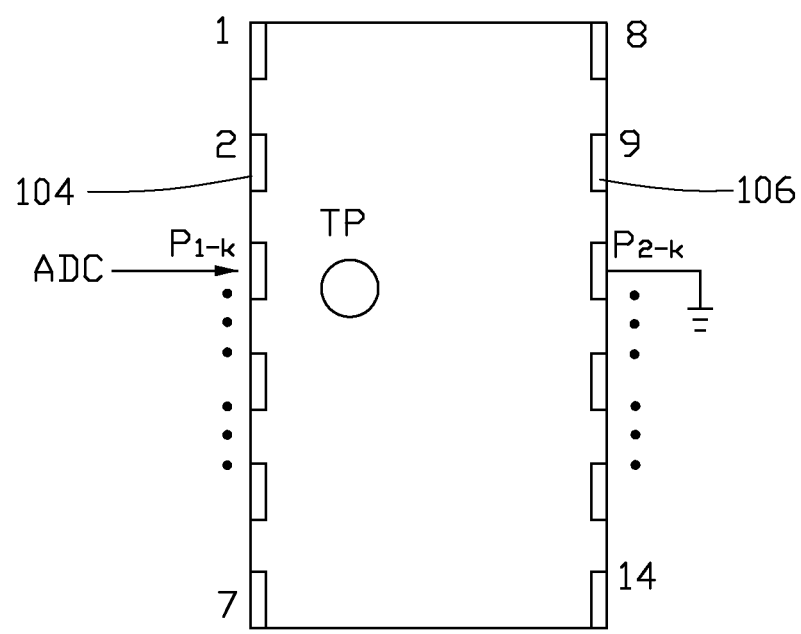
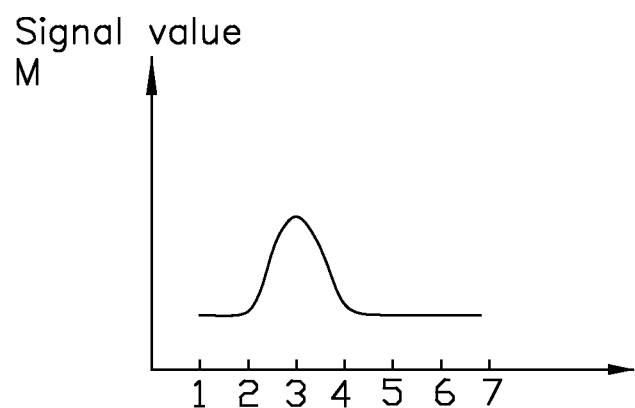
FIG. 5

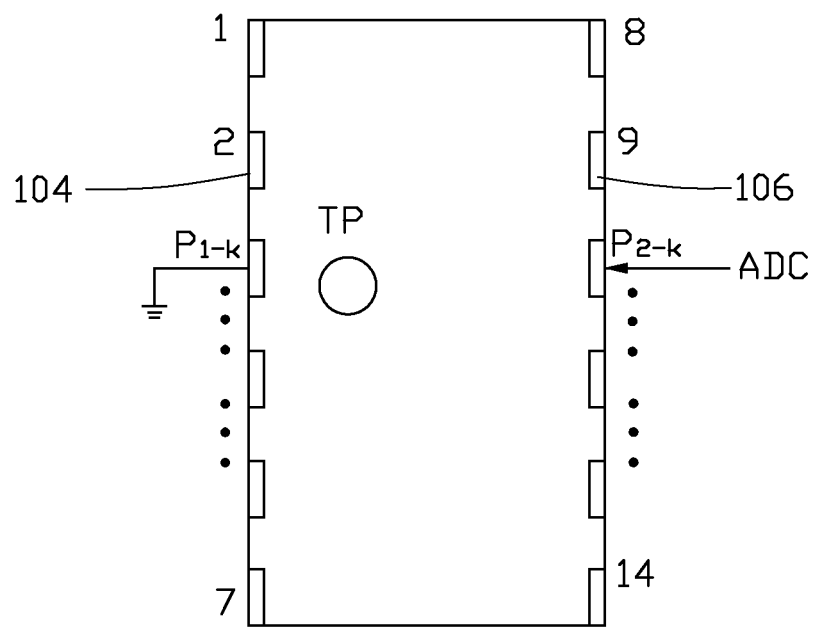
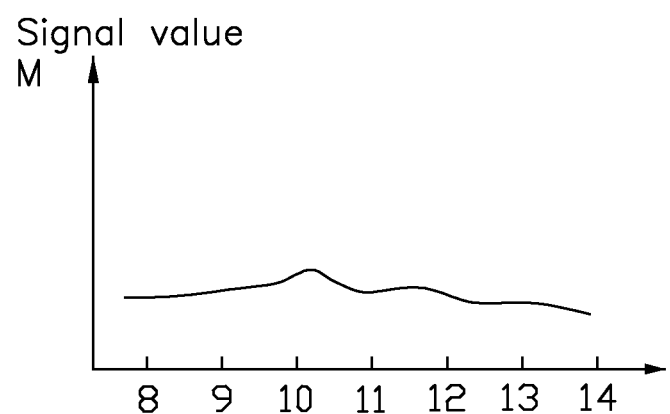
FIG. 6

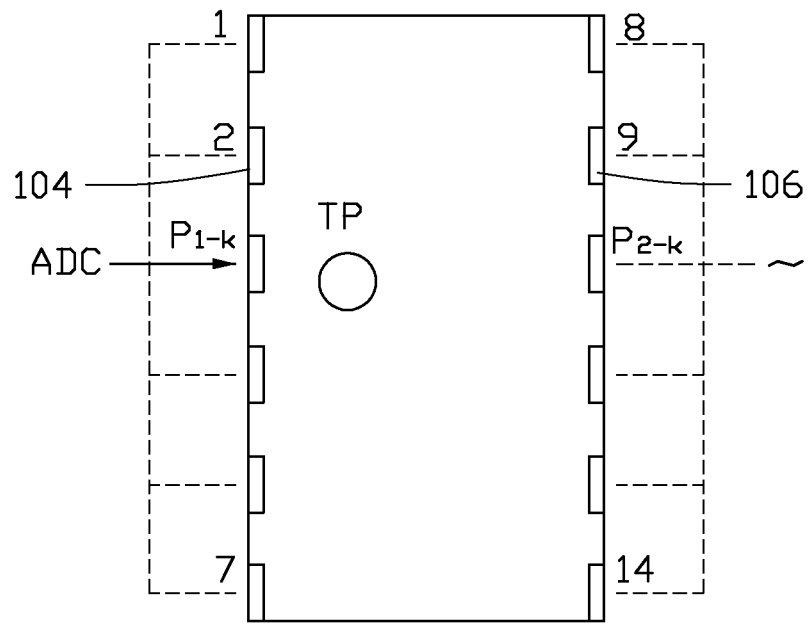
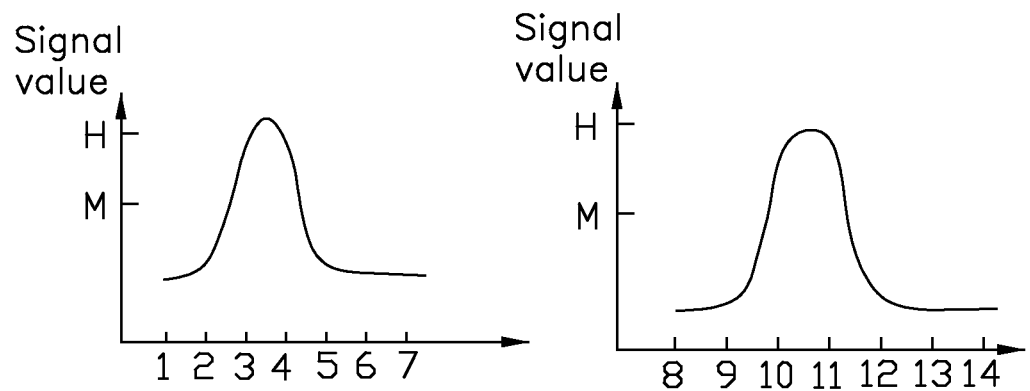
FIG. 7

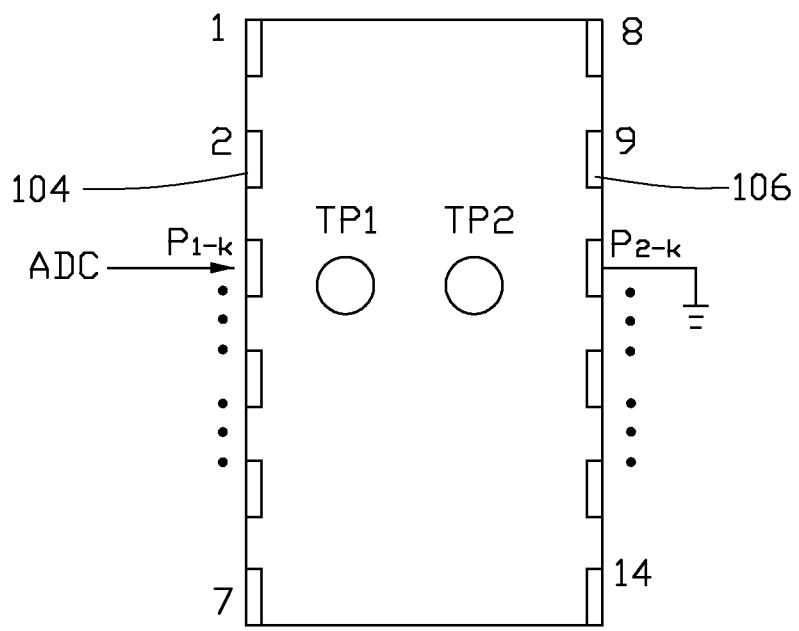
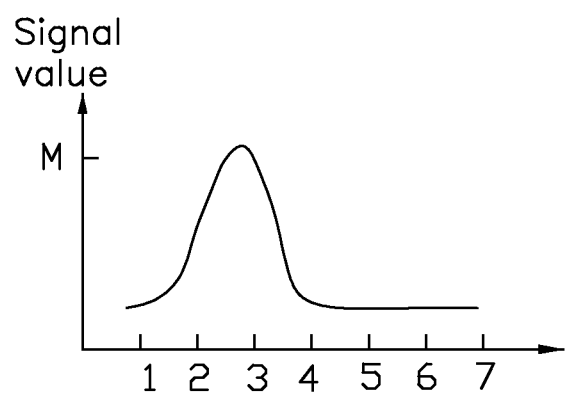
FIG. 8

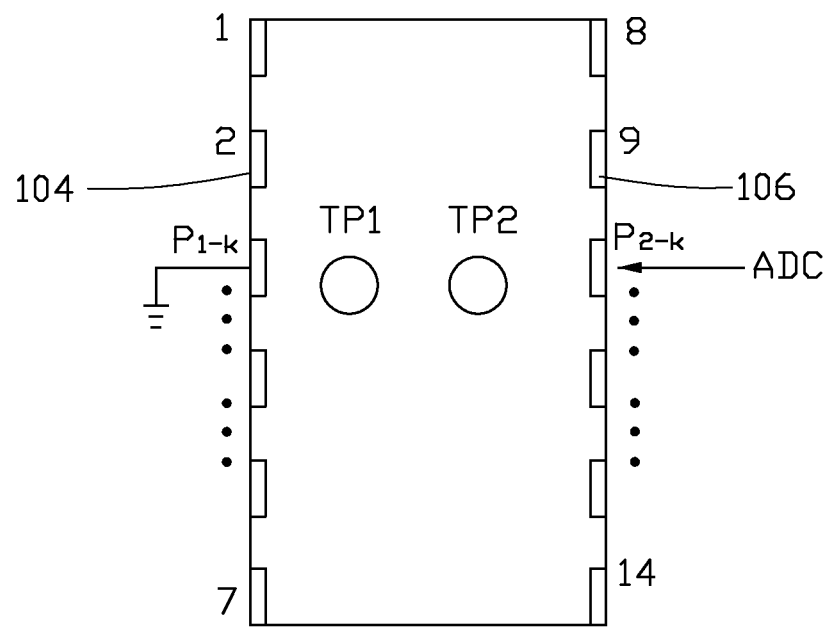
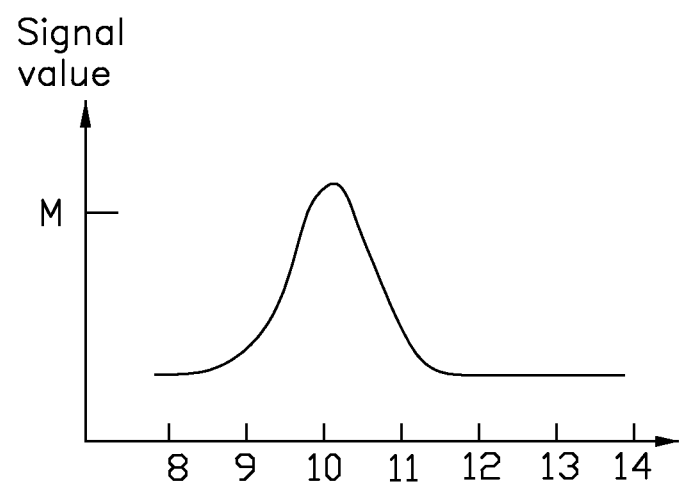
FIG. 9

METHOD FOR DETECTING TOUCH POINTS ON A TOUCH PANEL

CROSS-REFERENCE TO RELATED APPLICATIONS

This application claims all benefits accruing under 35 U.S.C. §119 from China Patent Application No. 201410031605.7, filed on Jan. 23, 2014, in the China Intellectual Property Office, the disclosure of which is incorporated herein by reference.

BACKGROUND

1. Technical Field

The present disclosure relates to a method for determining touch point coordinates, particularly to a method for determining touch point coordinates on capacitive type touch panel with single conductive layer.

2. Description of Related Art

Touch panels or touch screens are widely applied in electronic apparatuses, particularly in portable or hand-held electronic apparatuses, such as personal digital assistants (PDA) or mobile phones. Touch panels involve integration of resistive-type, capacitive-type or optical touch technologies and display panels.

A conventional capacitive-type touch panel includes two pattern layers made of transparent conductive materials formed on two surfaces of a glass substrate respectively to detect two-dimensional coordinates on the pattern layers. The transparent conductive material of conventional touch panel is indium tin oxide (ITO). Recently, the research is focus on the capacitive-type touch panel with single layer of transparent conductive material. The single layer of transparent conductive material comprises a plurality of triangular electrodes extending along the same direction (X direction) and aligned side to side. Each two adjacent electrodes are coupled together to detect the touch point. However, the touch panel cannot distinguish the two points on the extending direction. Therefore, the touch panel is not suitable for multi-touching.

What is needed, therefore, is to provide a method for solving the problem discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 2 shows a schematic view of one embodiment of a method of determining touch point coordinates on the touch panel of FIG. 1.

FIG. 3 shows a schematic view of one embodiment of a curve line during determining touch point TP by sensing a plurality of first electrodes one by one.

FIG. 4 shows a schematic view of one embodiment of a curve line during determining touch point TP by sensing a plurality of second electrodes one by one.

FIG. 5 shows a schematic view of one embodiment of a curve line during determining touch point TP by sensing a plurality of first electrodes one by one.

FIG. 6 shows a schematic view of one embodiment of a curve line during determining touch point TP by sensing a plurality of second electrodes one by one.

FIG. 7 shows a schematic view of one embodiment of a curve line during determining touch points TP1 and TP2 by sensing a plurality of first electrodes and a plurality of second electrodes one by one.

FIG. 8 shows a schematic view of one embodiment of a curve line during determining touch points TP1 and TP2 by sensing a plurality of first electrodes.

FIG. 9 shows a schematic view of one embodiment of a curve line during determining touch points TP1 and TP2 by sensing a plurality of second electrodes one by one.

DETAILED DESCRIPTION

Figure 1:
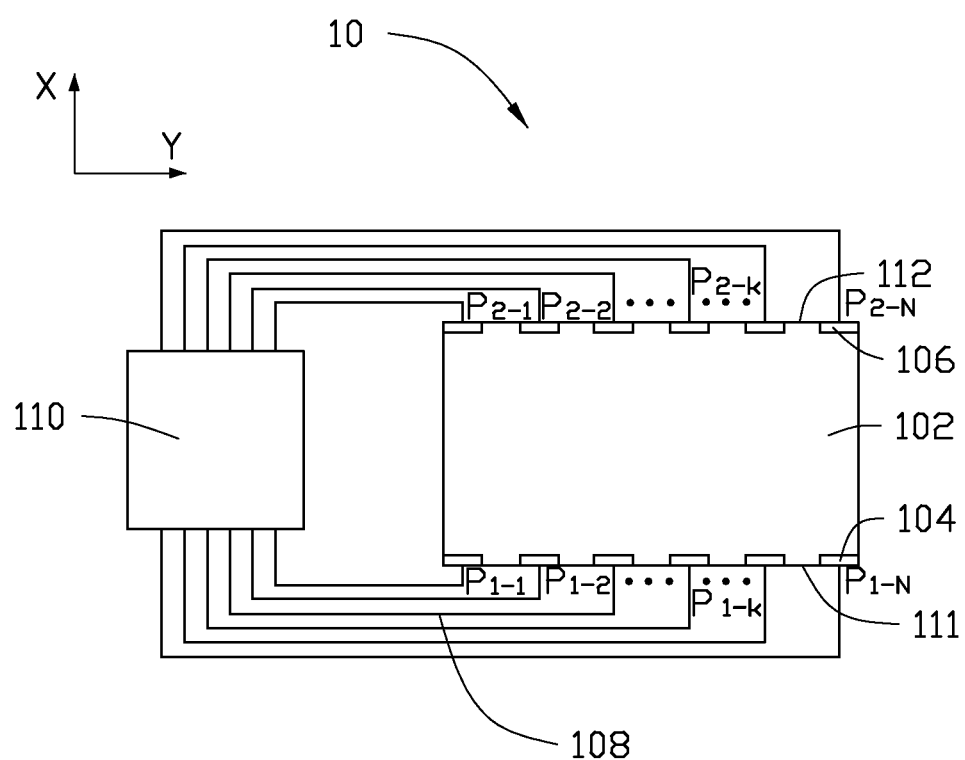
FIG. 1 is a schematic view of an embodiment of a touch panel.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, one embodiment of a touch panel 10 with single conductive layer comprises a conductive layer 102 on a substrate (not shown). The conductive layer 102 can be a layer having differing electrical impedances in different orientations.

In the present disclosure, different electrical impedances across different orientations is described as anisotropic (anisotropic impedance layer), meaning a structure having a relatively low impedance in direction D and a relatively high impedance in direction H on the same surface (e.g., the surface of the conductive layer 102). Electrical conductivity of the anisotropic impedance layer in direction H is smaller than the electrical conductivity in other directions. The electrical conductivity of the anisotropic impedance layer in direction D is larger than the electrical conductivity of the anisotropic impedance layer in other directions. Direction H is different from the direction D. In one embodiment, the relatively high impedance direction H is perpendicular to the relatively low impedance direction D. The relatively high impedance direction H and the relatively low impedance direction D of the anisotropic impedance layer can be achieved by having a plurality of conductive belts having a low conductivity aligned along the relatively high impedance direction H and a plurality of conductive belts having a high conductivity aligned along the relatively low impedance direction D, and the plurality of conductive belts having the low conductivity and the plurality of conductive belts having the low conductivity are electrically connected with each other. In another embodiment, the relatively high impedance direction H and the relatively low impedance direction D of the anisotropic impedance layer can be achieved by having a carbon nanotube film comprising orderly arranged carbon nanotubes. The conductive layer 102 can be a square shape having two sides perpendicular to the relatively high impedance direction H and two sides perpendicular to the relatively low impedance direction D. In one embodiment, the conductive layer 102 comprises a first side 111 and a second side 112 opposite the first side 111 along the X direction. A plurality of first electrodes 104 are located on the first side 111 and electrically connected to the conductive layer 102, and a plurality of second electrodes 106 are located on the second side 112 and electrically connected to the conductive layer 102. The plurality of first electrodes 104 and the plurality of second electrodes 106 are electrically connected to a driving and sensing unit 110 via a plurality of conductive leads 108 respectively. The driving and sensing unit 110 can drive the plurality of first electrodes 104 and the plurality of second electrodes 106 one by one or at the same time. Furthermore, the driving and sensing unit 110 can read the signals of touch points sensed by the plurality of first electrode 104 and the plurality of second electrodes 106. The signal input by each of the plurality of first electrode 104 and the plurality of second electrodes 106 to the conductive layer 102, or received from the conductive layer 102, will be transmitted mostly along the X direction.

The relative low impedance direction D can be defined as a first direction, such as a X direction. The relative high impedance direction H can be defined as a second direction, such as an Y direction. The second direction can be perpendicular with the first direction.

In some embodiments, the conductive layer 102 includes a carbon nanotube layer having anisotropic electrical conductivity. Carbon nanotubes of the carbon nanotube layer can be substantially arranged along the first direction, so that the first carbon nanotube layer has a greater electrical conductivity in the first direction than in other directions. Carbon nanotubes of the carbon nanotube layer can be substantially arranged along the second direction, so that the second carbon nanotube layer has a greater electrical conductivity in the second direction than in other directions. In some embodiments, the second carbon nanotube layer can be or include at least one carbon nanotube drawn film. The plurality of carbon nanotubes in the carbon nanotube film are joined end to end by van der Waals force along the X direction.

The plurality of first electrodes 104 and the plurality of second electrodes 106 are opposite to each other one by one. The plurality of first electrodes 104 listed from $P_{1-1}$ to $P_{1-N}$ are spaced from each other and arranged in a row along the Y direction. The plurality of second electrodes 106 listed from $P_{2-1}$ to $P_{2-N}$ are spaced from each other and arranged in a row along the Y direction. The conductive layer 102 between the plurality of first electrodes 104 and the plurality of second electrodes 106 is hereinafter referred to as touch region.

Further referring to FIG. 2, one embodiment of a method of determining touch point on touch panel 10 comprises:

step (S10), obtaining a first signal curve $A_{s1}$ by inputting driving electrical signals to each of the plurality of first electrodes 104 and sensing each of the plurality of first electrodes 104 one by one, wherein rest of the plurality of first electrodes 104 which are not sensed and the plurality of second electrodes 106 are input a potential during sensing each of the plurality of first electrodes 104 one by one;

step (S20), getting a second signal curve $A_{s2}$ by inputting driving electrical signals to each of the plurality of second electrodes 106 and sensing each of the plurality of second electrodes 106 one by one, wherein rest of the plurality of second electrodes 106 which are not sensed and the plurality of first electrodes 104 are input a potential during sensing each of the plurality of second electrodes 106 one by one;

step (S30), obtaining a third signal curve $B_{s1}$ by inputting driving electrical signals again to each of the plurality of first electrodes 104 and sensing each of the plurality of first electrodes 104 one by one, wherein at least one of the plurality of second electrodes 106 which opposite to the sensed one of the plurality of first electrodes 104 is grounded during sensing each of the plurality of first electrodes 104 one by one;

step (S40), getting a fourth signal curve $B_{s2}$ by inputting driving electrical signals to each of the plurality of second electrodes 106 again and sensing each of the plurality of second electrodes 106 one by one, wherein at least one of the first electrodes 104 which opposite to the sensed one of the plurality of second electrodes 105 is grounded during sensing each of the plurality of second electrodes 106 one by one; and step (S50), determining a quantity of touch points and obtaining coordinates of the touch points on the touch panel 10 by comparing the first signal curve $A_{s1}$, the second signal curve $A_{s2}$, the third signal curve $B_{s1}$, and the fourth signal curve $B_{s2}$.

In step (S10), the first signal curve $A_{s1}$ can be obtained through a plurality of first signal values through a plurality of capacity-to-digital converters. The plurality of capacity-to-digital converters scan each of the plurality of first electrodes 104 from $P_1$ to $P_{1-N}$ and transfer the signals to the plurality of first signal values. While sensing the first electrode $P_{1-K}$, the rest first electrodes 104 which are not sensed and the second electrodes 106 are provided with same potential as a voltage applied on the electrode $P_{1-K}$. Therefore, the leakage current can be avoided.

In step (S20), the second signal curve $A_{s2}$ can be obtained through a plurality of second signal values through the plurality of capacity-to-digital converters. The plurality of capacity-to-digital converters scan each of the plurality of second electrodes 106 from $P_1$ to $P_{1-N}$ and transfer the signals to the plurality of second signal values. While sensing the second electrode $P_{2-K}$, the rest second electrodes 106 which are not sensed and the second electrodes 106 are provided with same potential as a voltage applied on the electrode $P_{2-K}$. Therefore, the leakage current can be avoided.

In step (S30), the plurality of first electrodes 104 are driven and sensed one by one, and at least one of the plurality of second electrodes 106 opposite to the sensed one of the plurality of first electrodes 104 is grounded. Furthermore, the rest of the plurality of first electrodes 104 which are not sensed and the plurality of second electrodes 106 are grounded. Thus a leakage current can be occurred in the touch panel. While sensing the first electrode $P_{1-K}$, at least the second electrode $P_{2-K}$ opposite to the first electrode $P_{1-K}$ can be grounded. Furthermore, the rest of the plurality of first electrodes 104 and the second electrodes 106 can also be grounded or some of rest of the plurality of first electrodes 104 and the second electrodes 106 can be grounded.

Furthermore, the second electrode $P_{2-K}$ can also be applied with a potential lower than a sensing voltage applied on the first electrode $P_{1-K}$. Thus the leakage current can still occurred in the touch panel 10.

In step (S40), the plurality of second electrodes 106 are driven and sensed one by one, and at least one of the plurality of first electrodes 104 opposite to the sensed one of the plurality of second electrodes 106 is grounded. Furthermore, the rest of the plurality of second electrodes 106 which are not sensed and the plurality of first electrodes 104 are grounded. Thus a leakage current can be occurred in the touch panel. In one embodiment, while sensing the second electrode $P_{2-K}$, at least the first electrode $P_{1-K}$ opposite to the second electrode $P_{2-K}$ can be grounded. Furthermore, the rest of the plurality of second electrodes 106 and the first electrodes 104 can also be grounded or some of the rest of the plurality of first electrodes 104 and the second electrodes 106 can be grounded.

Furthermore, the first electrode $P_{1-K}$ can also be applied with a potential lower than a sensing voltage applied on the first electrode $P_{2-K}$. Thus the leakage current can still occurred in the touch panel 10.

In step (S50), whether there is single touch point or there are multi-touch points can be determined by comparing the first signal curve $A_{s1}$, the second signal curve $A_{s2}$, the third signal curve $B_{s1}$, and the fourth signal curve $B_{s2}$. Furthermore, the touch points can also be calculated from the peak value of the first signal curve $A_{s1}$, the second signal curve $A_{s2}$, the third signal curve $B_{s1}$, and the fourth signal curve $B_{s2}$.

In one embodiment, the touch points can be read out through comparing the third signal curve $B_{s1}$ with the first signal curve $A_{s1}$, and comparing the fourth signal curve $B_{s2}$ with the second signal curve $A_{s2}$. Referring to FIG. 3, in detail, a single touch point is assumed be located near the first electrode $P_{1-K}$. Thus in step (S10), during sensing the first electrode $P_{1-K}$, the rest of the plurality of first electrodes 104 and the plurality of second electrodes 106 are applied with the potential same as the sensing voltage applied on the first electrode $P_{1-K}$, thus a first signal peak $A_I$ is formed in the first signal curve $A_{s1}$.

Referring to FIG. 4, during sensing the second electrode $P_{2-K}$ opposite to the first electrode $P_{1-K}$, the rest of the plurality of second electrodes 106 which are not sensed and the plurality of first electrodes 104 are applied with the potential equal to the sensing voltage applied on the first electrode $P_{2-K}$, thus a second signal peak $B_1$ is formed in the second signal curve $A_{s2}$.

Referring to FIG. 5 and FIG. 6, because the leakage current existed in the touch panel 10, both a third signal peak $A_{II}$ of the third signal curve $B_{s1}$ in step (S30) and a fourth signal peak $B_{II}$ of the fourth signal curve $B_{s2}$ in step (S40) are decreased. While the touch point near the first electrode $P_{1-K}$, because the second electrode $P_{2-K}$ is grounded, the leakage current will be formed between the first electrode $P_{1-K}$ and the second electrode $P_{2-K}$ during sensing the first electrode $P_{1-K}$. Thus the third signal peak $A_{II}$ of the third signal curve $B_{s1}$ can be smaller than a half of the first signal peak $A_I$ of the first signal curve $A_{s1}$. The third signal peak $A_{II}$ is depended on the distance between the touch point and the first electrode $P_{1-K}$. The nearer between the first electrode $P_{1-K}$ and the touch point, the smaller of the third signal peak $A_{II}$.

Furthermore, during sensing the second electrode $P_{2-K}$, because the first electrode $P_{1-K}$ is grounded, the quantity of electricity will be quickly conducted out through the first electrode $P_{1-K}$, and the fourth signal peak $B_{II}$ of the fourth signal curve $B_{s2}$ will be dramatically decreased or disappear. Thus the fourth signal peak $B_{II}$ is smaller than the second signal peak $B_I$. A threshold value $C_0$ is set according to the requirement of resolution and sensitivity. While $|A_{II}-B_{II}|>C_0$, there is a single touch point on the touch panel 10. Otherwise, there are multiple touch points on the touch panel 10. Furthermore, the quantity of the touch point can also be determined by comparing $A_{II}$ and $B_{II}$ with $C_0$. If $A_{II}$ or $B_{II}$ is smaller than the $C_0$, there is single touch point on the touch panel 10.

Referring to FIG. 7, while there are two touch points P1 and P2 between the first electrode $P_{1-K}$ and the second electrode $P_{2-K}$ on the touch panel 10, both a first signal peak $A'_1$ and a second signal peak $B'_1$ will be greater than the first signal peak $A_I$ and the second peak $B_1$ respectively. In one embodiment, both the first signal peak $A'_1$ and the second signal peak $B'_1$ are two times than the first signal peak $A_I$ and the second signal peak $B_1$ respectively.

Referring to FIG. 8 and FIG. 9, in step (S30), during sensing the first electrode $P_{1-K}$ with the second electrode $P_{2-K}$ is grounded, because the touch point TP1 is near the first electrode $P_{1-K}$, at least the quantity of electricity caused by the touch point TP1 can still be sensed through the first electrode P1-K. Thus a third signal peak $A'_{II}$ is greater than a half of the first signal peak $A'_1$. At the same time, in step (S40), during sensing the second electrode $P_{2-K}$ with the first electrode $P_{1-K}$ is grounded, because the second touch point TP2 is near the second electrode $P_{2-K}$, a fourth signal peak $B_{II}$ is also greater than a half of the second signal peak $B'_I$.

Furthermore, during sensing the first electrode $P_{1-K}$ with the second electrode $P_{2-K}$ is grounded, the quantity of electricity caused by the touch panel TP1 will not be affected or conducted out through the second electrode $P_{2-K}$. Similarly, during sensing the second electrode $P_{2-K}$ with the first electrode $P_{1-K}$ is grounded, the quantity of electricity caused by the touch panel TP2 will not be affected. The coordinates of the touch points TP1 and TP2 can be calculated by following steps.

In step (S30), a first signal value $C_{1A}$ is defined as the quantity of electricity caused by the touch point TP1 and sensed by the first electrode $P_{1-K}$. A second signal value $C_{1B}$ is defined as the quantity of electricity caused by the touch point TP2 and sensed by the first electrode $P_{1-K}$. In step (S40), a third signal value $C_{2A}$ is defined as the quantity of electricity caused by the touch point TP1 and sensed by the first electrode $P_{1-K}$. A fourth value $C_{2B}$ is defined as the quantity of electricity caused by the touch point TP2 and sensed by the second electrode $P_{2-K}$. Then, $C_{1A}=A'_{II}, C_{2B}=B'_{II};$ $C_{1B}=B'_I-B'_{II}, C_{2A}=A'_I-A'_{II}.$ Thus the coordinate $X_1$ of touch point TP1 and coordinate $X_2$ of touch point TP2 on X direction can be calculated through:

$$X_1 = \frac{P_X}{2} + \frac{(C_{1A} - C_{1B})}{(C_{1A} + C_{1B})} \times \frac{P_X}{2};$$

$$X_2 = \frac{P_X}{2} + \frac{(C_{2A} - C_{2B})}{(C2_{1A} + C_{2B})} \times \frac{P_X}{2}.$$

wherein $P_X$ is a resolution of the X direction of the touch panel 10. In one embodiment, the value of the resolution can be set by the driving detecting unit 110, for example, the value is in the range of 480 to 1024.

Furthermore, the $X_1$ and $X_2$ can be used to determine whether there are two touch points or there is single touch point on the touch panel. $l_0$ is set as the threshold value which the touch panel 10 can recognize along the X direction. While $|X1-X2|<l_0$, the two touch points TP1 and TP2 cannot be recognized by the touch panel, thus the touch point TP1 and the touch point TP2 will be recognized as single touch point. Then the touch panel 10 can be responded to the single touch point in the following process. $l_0$ can be selected according to the resolution along the X direction.

The method for determining a touch point has following advantages. The conductive layer is anisotropic impedance layer, thus the touch points on the touch panel can be detected by grounding and applying potential to the electrodes which are not sensed. Furthermore, the coordinates of the two coaxial touch points can be calculated out. Thus the detection accuracy and the sensitivity of the touch can be improved.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A method for detecting touch points on a touch panel comprising:
   providing a capacitive type touch panel comprising a conductive layer, a plurality of first electrodes and a plurality of second electrodes, wherein the conductive layer comprises relative low impedance in a direction X and a relative high impedance in a direction Y, and a first side and second side opposite the first side along the direction X; the plurality of first electrodes located on the first side and electrically connected to the conductive layer; and the plurality of second electrodes located on the second side and electrically connected to the conductive layer;
   obtaining a first signal curve $A_{s1}$ by inputting driving electrical signals to each of the plurality of first electrodes and sensing each of the plurality of first electrodes one by one, wherein rest of the plurality of first electrodes which are not sensed and the plurality of second electrodes are input a first potential during sensing each of the plurality of first electrodes one by one;
   getting a second signal curve $A_{s2}$ by inputting driving electrical signals to each of the plurality of second electrodes and sensing each of the plurality of second electrodes one by one, wherein rest of the plurality of second electrodes which are not sensed and the plurality of first electrodes are input a second potential during sensing each of the plurality of second electrodes one by one;
   obtaining a third signal curve $B_{s1}$ by inputting driving electrical signals again to each of the plurality of first electrodes and sensing each of the plurality of first electrodes one by one, wherein at least one of the plurality of second electrodes which opposite to the sensed one of the plurality of first electrodes is grounded during sensing each of the plurality of first electrodes one by one; and
   getting a fourth signal curve $B_{s2}$ by inputting driving electrical signals to each of the plurality of second electrodes again and sensing each of the plurality of second electrodes one by one, wherein at least one of the plurality of first electrodes which opposite to the sensed one of the plurality of second electrodes is grounded during sensing each of the plurality of second electrodes one by one; and
   determining the number of touch points and obtaining coordinates of the touch points on the touch panel by comparing the first signal curve $A_{s1}$, the second signal curve $A_{s2}$, the third signal curve $B_{s1}$, and the fourth signal curve $B_{s2}$.

2. The method of claim 1, wherein the conductive layer comprises a carbon nanotube film.

3. The method of claim 2, wherein the carbon nanotube film comprises a plurality of carbon nanotube joined end to end by van der Waals force along the direction X.

4. The method of claim 1, wherein the first signal curve $A_{s1}$ is obtained by sensing the plurality of first electrodes one by one, and the first potential applied on the rest of the plurality of first electrodes which are not sensed and the plurality of second electrodes is equal to a voltage of the sensed one of the plurality of first electrodes.

5. The method of claim 1, the second signal curve $A_{s2}$ is obtained by sensing the plurality of second electrodes one by one, and the second potential applied on the rest of the plurality of second electrodes which are not sensed and the plurality of first electrodes is equal to a voltage of the sensed one of the plurality of second electrodes.

6. The method of claim 1, wherein the third signal curve $B_{s1}$ is obtained by sensing the plurality of first electrodes one by one, and the rest of the plurality of first electrodes which are not sensed and the plurality of second electrodes are grounded.

7. The method of claim 1, wherein the fourth signal curve $B_{s2}$ is obtained by sensing the plurality of second electrodes one by one, and the rest of the plurality of second electrodes which are not sensed and the plurality of first electrodes are grounded.

8. The method of claim 1, wherein further comprising determining whether there is single touch point or two touch points by comparing the third signal curve $B_{s1}$ and the first signal curve $A_{s1}$, and comparing the fourth signal curve $B_{s2}$ and the second signal curve $A_{s2}$.

9. The method of claim 8, wherein a first signal peak $A_I$ of the first signal curve $A_{s1}$, a second signal peak $B_I$ of the second signal curve $A_{s2}$, a third signal peak $A_{II}$ of the third signal curve $B_{s1}$, and a fourth signal peak $B_{II}$ of the fourth signal curve $B_{s2}$ are obtained.

10. The method of claim 9, wherein while $|A_{II}-B_{II}|>C_0$, it is determined that there is single touch point on the touch panel; otherwise it is determined that there are a first touch point and a second touch point on the touch panel, wherein $C_0$ is a preset threshold value.

11. The method of claim 10, wherein a first signal value $C_{1A}$ is defined as a quantity of electricity caused by the first touch point and sensed by the first electrode $P_{1-K}$; a second signal value $C_{1B}$ is defined as a quantity of electricity caused by the second touch point and sensed by the first electrode $P_{1-K}$; a third signal value $C_{2A}$ is defined as the quantity of electricity caused by the first touch point and sensed by the first electrode $P_{1-K}$; a fourth value $C_{2B}$ is defined as the quantity of electricity caused by the second touch point and sensed by the second electrode $P_{2-K}$; then, a first signal peak $A'_I$, a second signal peak $B'_I$, a third signal peak $A'_{II}$, a fourth signal peak $B'_{II}$ are defined as following:

$$C_{1A}=A'_{II}, C_{2B}=B'_{II};$$

$$C_{1B}=B'_I-B'_{II}, C_{2A}=A'_I-A'_{II}.$$

12. The method of claim 11, wherein a first coordinate of the first touch point is obtained through the first signal value $C_{1A}$ and the second signal value $C_{1B}$, and a second coordinate of the second touch point is obtained through the second third signal value $C_{2A}$ and the fourth signal value $C_{2B}$.

13. The method of claim 12, wherein the first coordinate of the first touch point and the second coordinate of the second touch point is calculated by:

$$X_1 = \frac{P_X}{2} + \frac{(C_{1A} - C_{1B})}{(C_{1A} + C_{1B})} \times \frac{P_X}{2};$$

$$X_2 = \frac{P_X}{2} + \frac{(C_{2A} - C_{2B})}{(C2_{1A} + C_{2B})} \times \frac{P_X}{2};$$

wherein $P_X$ is a resolution along the direction X of the touch panel, X1 is the first coordinate, and X2 is the second coordinate.

14. The method of claim 13, wherein while $|X1-X2|<l_0$, the first touch point and the second touch point is recognized as a single touch point, wherein $l_0$ is a threshold value which the touch panel is capable of recognizing along the X direction.

15. A method for detecting touch points on a touch panel comprising:
   providing a capacitive type touch panel comprising a conductive layer, a plurality of first electrodes and a plurality of second electrodes, wherein the conductive layer comprises relative low impedance in a direction X and a relative high impedance in a direction Y, and a first side and second side opposite the first side along the direction X; the plurality of first electrodes located on the first side and electrically connected to the conductive layer; and the plurality of second electrodes located on the second side and electrically connected to the conductive layer;
   obtaining a first signal curve $A_{s1}$ by inputting driving electrical signals to each of the plurality of first electrodes and sensing each of the plurality of first electrodes one by one, wherein rest of the plurality of first electrodes which are not sensed and the plurality of second electrodes are input a first potential during sensing each of the plurality of first electrodes one by one;
   getting a second signal curve $A_{s2}$ by inputting driving electrical signals to each of the plurality of second electrodes and sensing each of the plurality of second electrodes one by one, wherein rest of the plurality of second electrodes which are not sensed and the plurality of first electrodes are input a second potential during sensing each of the plurality of second electrodes one by one;
   obtaining a third signal curve $B_{s1}$ by inputting driving electrical signals again to each of the plurality of first electrodes and sensing each of the plurality of first electrodes one by one, wherein at least one of the plurality of second electrodes, which opposite to the sensed one of the plurality of first electrodes, is grounded during sensing each of the plurality of first electrodes one by one; and
   getting a fourth signal curve $B_{s2}$ by inputting driving electrical signals to each of the plurality of second electrodes again and sensing each of the plurality of second electrodes one by one, wherein at least one of the first electrodes, which opposite to the sensed one of the plurality of second electrodes, is grounded during sensing each of the plurality of second electrodes one by one; and
   determining the number of touch points and obtaining coordinates of the touch points on the touch panel by comparing the first signal curve $A_{s1}$, the second signal curve $A_{s2}$, the third signal curve $B_{s1}$, and the fourth signal curve $B_{s2}$.

* * * * *